United States Patent
Lau et al.

(10) Patent No.: US 12,166,855 B2
(45) Date of Patent: Dec. 10, 2024

(54) SAFETY EXTENSION FOR PRECISION TIME PROTOCOL (PTP)

(71) Applicant: Marvell Asia Pte Ltd, Singapore (SG)

(72) Inventors: Timothy See-Hung Lau, Laguna Niguel, CA (US); Peter Weber, Weingarten (DE); Olaf Mater, Linkenheim-Hochstetten (DE)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/463,582

(22) Filed: Sep. 1, 2021

(65) Prior Publication Data
US 2022/0069973 A1    Mar. 3, 2022

Related U.S. Application Data

(60) Provisional application No. 63/074,379, filed on Sep. 3, 2020.

(51) Int. Cl.
*H04L 7/00* (2006.01)
*H04L 43/04* (2022.01)
(Continued)

(52) U.S. Cl.
CPC ............ *H04L 7/0054* (2013.01); *H04L 43/04* (2013.01); *H04L 43/06* (2013.01); *H04L 43/50* (2013.01); *H04L 67/12* (2013.01)

(58) Field of Classification Search
CPC ..... H04L 43/004; H04L 43/006; H04L 43/50; H04L 43/106; H04L 69/28; H04L 47/28;
(Continued)

(56) References Cited

U.S. PATENT DOCUMENTS

| 9,616,828 B2 * | 4/2017 | Ben Noon | H04L 12/4625 |
| 2010/0183034 A1 * | 7/2010 | Kroepfl | H04L 67/12 370/503 |

(Continued)

FOREIGN PATENT DOCUMENTS

| CN | 4191978 A1 * | 7/2020 | ............ H04W 72/30 |
| WO | 2019081463 A1 | 5/2019 | |

OTHER PUBLICATIONS

Heffernan et al., "Runtime Oservation of Functional Safety Properties in an Automotive Control Network," Journal of Systems Architecture, Elsevier BV, NL, vol. 68, pp. 38-50, May 12, 2016.

(Continued)

*Primary Examiner* — Tonia L Dollinger
*Assistant Examiner* — Linh T. Nguyen

(57) ABSTRACT

A network element, for use in an automotive network in a vehicle, includes one or more ports, packet processing circuitry and a validation data collector. The one or more ports are configured for communicating over the automotive network in the vehicle. The packet processing circuitry is configured to receive packets from the automotive network via the one or more ports, the packets including time-protocol packets, to process the received packets, and to forward the processed packets to the automotive network via the one or more ports. The validation data collector is configured to derive, from at least some of the time-protocol packets that are processed by the packet-processing circuitry, validation data indicative of compliance of the network element with a vehicle-safety requirement, and to make the validation data accessible from outside the network element.

18 Claims, 3 Drawing Sheets

(51) Int. Cl.
*H04L 43/06* (2022.01)
*H04L 43/50* (2022.01)
*H04L 67/12* (2022.01)

(58) Field of Classification Search
CPC ....... H04L 7/0012; H04L 7/0016; H04L 7/04;
H04L 7/0054; H04L 63/04; H04L 7/00;
H04L 2463/121; H04L 7/0008; H04L
43/04; H04L 43/06; H04L 67/12; H04L
2209/84
See application file for complete search history.

(56) References Cited

U.S. PATENT DOCUMENTS

| | | | | |
|---|---|---|---|---|
| 2013/0190967 | A1* | 7/2013 | Hassib | G07C 5/0816 |
| | | | | 701/31.5 |
| 2016/0308791 | A1* | 10/2016 | Subasingha | G10L 19/167 |
| 2017/0366430 | A1 | 12/2017 | Seo et al. | |
| 2019/0018408 | A1* | 1/2019 | Gulati | G08G 1/09623 |
| 2019/0319793 | A1* | 10/2019 | Schooler | H04L 9/3268 |
| 2019/0356466 | A1* | 11/2019 | Kratz | H04L 7/041 |
| 2019/0363815 | A1* | 11/2019 | Bogenberger | H04L 43/0858 |
| 2020/0044937 | A1* | 2/2020 | Joos | H04J 3/0635 |
| 2020/0073774 | A1* | 3/2020 | Deb | G06F 11/2733 |
| 2020/0145433 | A1* | 5/2020 | Gutierrez | G06N 3/08 |
| 2020/0209867 | A1* | 7/2020 | Valois | G01S 7/4808 |
| 2020/0280383 | A1* | 9/2020 | Herber | H04J 3/0638 |
| 2020/0287803 | A1* | 9/2020 | Sedarat | H04L 43/106 |
| 2020/0357205 | A1* | 11/2020 | Bennington | G01S 7/003 |
| 2020/0389469 | A1* | 12/2020 | Litichever | H04L 63/029 |
| 2021/0014248 | A1* | 1/2021 | Weber | H04L 12/4641 |
| 2021/0014257 | A1* | 1/2021 | Weber | H04L 69/22 |
| 2021/0075800 | A1* | 3/2021 | Paraskevas | H04L 63/1441 |
| 2021/0349977 | A1* | 11/2021 | Kishikawa | B60W 40/09 |
| 2021/0389140 | A1* | 12/2021 | Soryal | G08G 1/07 |
| 2021/0394770 | A1* | 12/2021 | Rocha | B60W 60/0018 |
| 2022/0374372 | A1* | 11/2022 | Xian | H04L 9/40 |
| 2022/0376808 | A1* | 11/2022 | Zinner | H04L 67/12 |
| 2023/0019817 | A1* | 1/2023 | Huang | H04L 63/0227 |
| 2023/0067338 | A1* | 3/2023 | Zhong | H04L 69/321 |
| 2023/0156748 | A1* | 5/2023 | Li | H04W 4/08 |
| | | | | 370/329 |

OTHER PUBLICATIONS

Kane et al., "A Case Study on Runtime Monitoring of an Autonomous Research Vehicle (ARV) System," Proceedings of the 17th International Conference on Image Analysis and Processing—ICIAP, Lecture Notes in Computer Science, Springer, Berlin—Heidelberg, pp. 102-117, Nov. 15, 2015.
International Application # PCT/IB2021/057977 Search Report dated Nov. 24, 2021.
ISO/FDIS 26262-1:2018(E) standard, "Road Vehicles—Functional Safety—Part I: Vocabulary," ISO, pp. 1-40, year 2018.
IEEE 802.1AS-2020, "IEEE Standard for Local and Metropolitan Area Networks—Timing and Synchronization for Time-Sensitive Applications," IEEE Computer Society, pp. 1-421, year 2020.
IEEE 802.3bw-2015, "IEEE Standard for Ethernet, Amendment 1: Physical Layer Specifications and Management Parameters for 100 Mb/s Operation over a single Balanced Twisted PairCable (100Base-T1)", IEEE Computer Society, pp. 1-88, year 2015.
IEEE 802.3cg-2019, "IEEE Standard for Ethernet, Amendment 5: Physical Layer Specifications and Management Parameters for 10 Mb/s Operation and Associated Power Delivery over a Single Balanced Pair of Conductors", IEEE Computer Society, pp. 1-256, year 2019.
IEEE 802.3ch-2020, "IEEE Standard for Ethernet, Amendment 8: Physical Layer Specifications and Management Parameters for 2.5 GB/s, 5 GB/s, and 10 GB/s Automotive Electrical Ethernet", IEEE Computer Society, pp. 1-207, year 2020.
Farjadrad et al., U.S. Appl. No. 17/396,710, filed Aug. 8, 2021.
EP Application # 21789816.2 Office Action dated Jun. 26, 2024.

\* cited by examiner

SAFETY EXTENSION FOR PRECISION TIME PROTOCOL (PTP)

CROSS-REFERENCE TO RELATED APPLICATIONS

This application claims the benefit of U.S. Provisional Patent Application 63/074,379, filed Sep. 3, 2020, whose disclosure is incorporated herein by reference.

FIELD OF THE DISCLOSURE

The present disclosure relates generally to communication networks, and particularly to methods and systems for verifying functional safety of communication devices based on time-protocol packets.

BACKGROUND

Electronics systems and devices in a vehicle are typically required to comply with functional safety requirements. Functional safety requirements are specified, for example, in the ISO 26262-1:2018 standard entitled "Road vehicles—Functional safety," December, 2018.

The description above is presented as a general overview of related art in this field and should not be construed as an admission that any of the information it contains constitutes prior art against the present patent application.

SUMMARY

An embodiment that is described herein provides a network element for use in an automotive network in a vehicle. The network element includes one or more ports, packet processing circuitry and a validation data collector. The one or more ports are configured for communicating over the automotive network in the vehicle. The packet processing circuitry is configured to receive packets from the automotive network via the one or more ports, the packets including time-protocol packets, to process the received packets, and to forward the processed packets to the automotive network via the one or more ports. The validation data collector is configured to derive, from at least some of the time-protocol packets that are processed by the packet-processing circuitry, validation data indicative of compliance of the network element with a vehicle-safety requirement, and to make the validation data accessible from outside the network element.

In some embodiments, the validation data collector is configured to derive and export validation records comprising one or more of: time-stamps extracted from one or more of the time-protocol packets; one or more parameters of the one or more ports used for communicating one or more of the time-protocol packets; and error events relating to one or more of the time-protocol packets. In some embodiments the time-protocol packets include Precision Time Protocol (PTP) packets.

In a disclosed embodiment, the validation data collector is configured to store the validation data in a memory, and to provide at least part of the validation data in response to a request from outside the network element. In another embodiment, the validation data collector is configured to transmit at least part of the validation data from the network element, irrespective of any request from outside the network element.

There is additionally provided, in accordance with an embodiment that is described herein, a safety validation apparatus for use in a vehicle. The apparatus includes an interface and a validation processor. The interface is configured for communicating at least with a network element of an automotive network in the vehicle. The validation processor is configured to obtain from the network element validation data indicative of processing of time-protocol packets by the network element, and to verify, based on the validation data, that the network element complies with a vehicle-safety requirement.

In an embodiment, the validation processor is configured to verify that the network element complies with the vehicle-safety requirement by verifying an accuracy of one or more time-stamps in the time-protocol packets. In another embodiment, the validation processor is configured to verify that the network element complies with the vehicle-safety requirement by verifying that a temporal pattern of the time-protocol packets matches an expected pattern. In yet another embodiment, the validation processor is configured to verify that the network element complies with the vehicle-safety requirement by verifying a topology of the automotive network.

There is also provided, in accordance with an embodiment that is described herein, a method for use in a network element of an automotive network in a vehicle. The method includes receiving in the network element packets from the automotive network, the packets including time-protocol packets, processing the received packets and forwarding the processed packets to the automotive network. Validation data, which is indicative of compliance of the network element with a vehicle-safety requirement, is derived in the network element from at least some of the time-protocol packets. The validation data is made accessible from outside the network element.

There is further provided, in accordance with an embodiment that is described herein, a safety validation method for use in a vehicle. The method includes obtaining, from a network element of an automotive network in the vehicle, validation data indicative of processing of time-protocol packets by the network element. A verification is made, based on the validation data, that the network element complies with a vehicle-safety requirement.

The present disclosure will be more fully understood from the following detailed description of the embodiments thereof, taken together with the drawings in which:

DETAILED DESCRIPTION OF EMBODIMENTS

Figure 1:
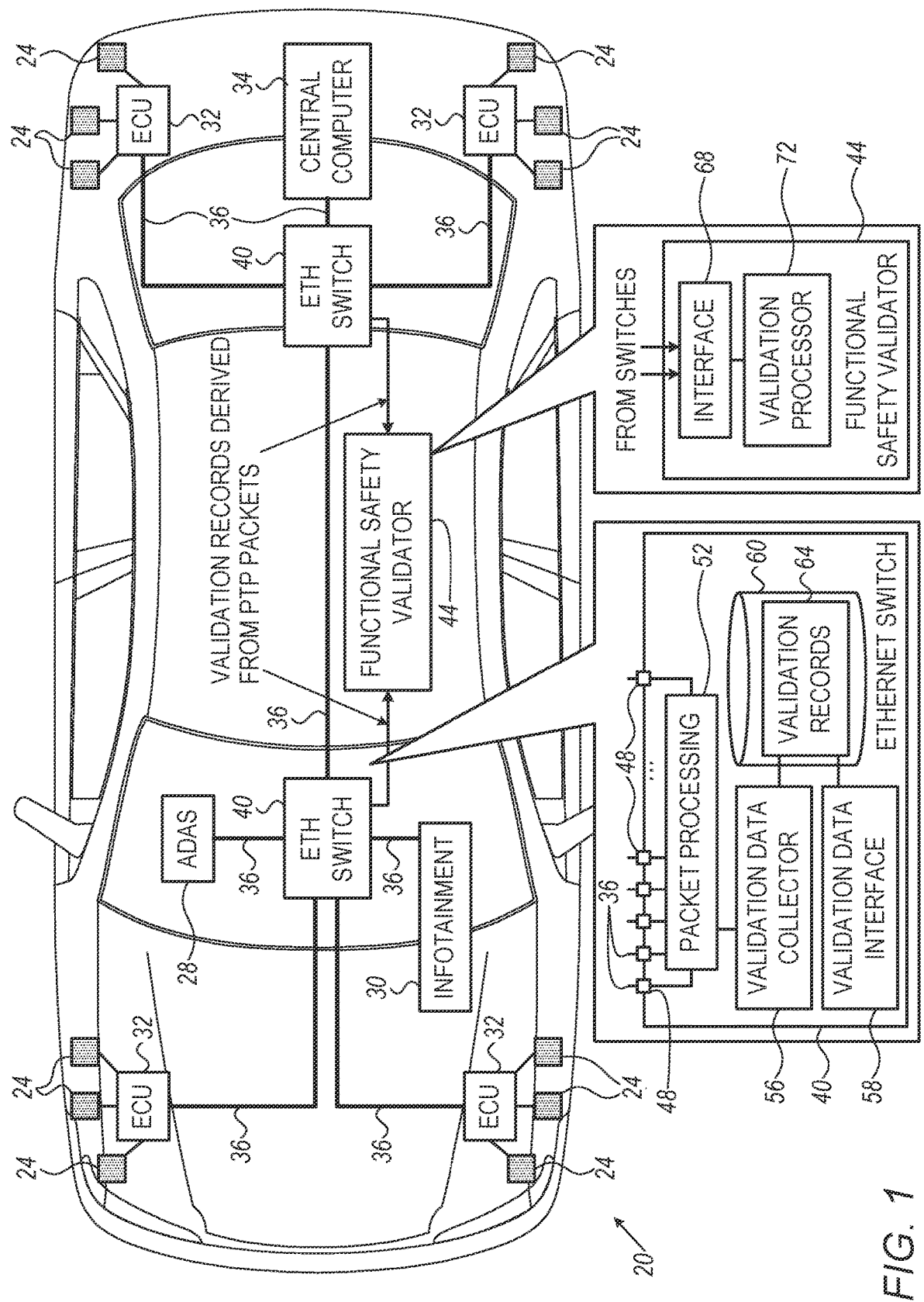
FIG. 1 is a block diagram that schematically illustrates an automotive data-processing system, in accordance with an embodiment that is described herein.

Safety-critical components of a vehicle are typically required to comply with functional safety requirements, such as requirements specified in the ISO 26262-1:2018 standard, cited above. Network elements deployed in the vehicle, e.g., Ethernet switches, are examples of safety-critical components. In practice, however, commercial network elements do not always comply with functional safety requirements. Redesigning a network element for self-contained full compliance is complex and expensive.

Embodiments described herein provide methods and systems for verifying that network elements of an automotive network are functionally safe, even though the network elements are not themselves compliant to be used in a functional safety environment.

The disclosed techniques make use of time-protocol packets that are communicated among the network elements as part of the normal operation of the automotive network. For example, many automotive networks use the Precision Time Protocol (PTP) for internal synchronization among network elements and/or for synchronization with external events. The use of PTP in Local-Area Networks (LANs) is specified, for example, in the IEEE 802.1AS-2020 standard, entitled "IEEE Standard for Local and Metropolitan Area Networks—Timing and Synchronization for Time-Sensitive Applications in Bridged Local Area Networks," Jun. 19, 2020, whose disclosure is incorporated herein by reference. The use of PTP involves on-going transmission of PTP packets carrying time-stamps across the automotive network. The disclosed techniques monitor such time-protocol packets and use the monitoring results for functional safety validation.

In some embodiments, an automotive network in a vehicle comprises multiple network elements, e.g., Ethernet switches. Each network element comprises one or more ports for receiving and transmitting packets over the network, and packet processing circuitry that processes received packets and forwards them back to the network. Some of the packets processed by the packet-processing circuitry are time-protocol packets, e.g., PTP packets.

In some embodiments, each network element further comprises a validation data collector that derives validation data from the time-protocol packets that are processed by the packet-processing circuitry. Validation data is also referred to herein as validation records, and the two terms are used interchangeably herein. The validation data may comprise any suitable information that relates to the time-protocol packets and is indicative of compliance of the network element with functional safety requirements. Non-limiting examples of validation data include time-stamps extracted from time-protocol packets, parameters of ports used for communicating time-protocol packets, and error events relating to time-protocol packets. The validation data collector makes the validation data accessible for readout from outside the network element via a suitable interface. The interface may be an Ethernet interface, for example, or any other suitable interface.

In some embodiments the network further comprises an additional node, referred to herein as "functional safety validator," or simply "validator" for brevity. The validator obtains validation data from the various network elements and verifies, based on the validation data, whether the network elements comply with the relevant functional safety requirements.

In various embodiments, the validator may analyze the validation data in any suitable way to verify the functional safety of the network elements, and of the network as a whole. Several examples are suggested herein. In some embodiments, the network elements present an interface that enables the validator to retrieve validation data as needed. With an interface of this sort, the definition of validation tests can be made vendor-specific, e.g., left to the discretion of the vehicle manufacturer.

In summary, the techniques disclosed herein enable an automotive network to comply with applicable functional safety requirements, without mandating that every individual network element be compliant. This solution minimizes the additional hardware or software that needs to be added to network elements for the sake of functional safety validation. By making use of existing time-protocol packets, the disclosed solution also minimizes the additional network traffic needed for functional safety validation.

The embodiments described herein mainly focus on automotive networks, and on vehicle-safety as a special case of functional safety. Generally, however, the disclosed techniques are not limited to automotive environments. The disclosed techniques may be used in any suitable system or application in which communication devices are required to comply with functional safety requirements. Such applications may include, for example, industrial communication networks, aviation communication networks, aerospace communication systems, and many others.

FIG. 1 is a block diagram that schematically illustrates an automotive data-processing system 20, in accordance with an embodiment that is described herein. System 20 is disposed in a vehicle, and comprises various sensors 24, multiple Electronics Control Units (ECUs) 32, an Advanced Driver-Assistance System (ADAS) 28, an infotainment system 30 and a central computer 34. By way of non-limiting example only, embodiments herein are described in the context of automobiles.

In various embodiments, sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors.

The various sensors 24 and the various electronic systems (e.g., ECUs 32, ADAS 28, infotainment system 30 and central computer 34) are referred to collectively as "electronic subsystems" or "subsystems". In some embodiments, the various electronic subsystems of system 20 communicate over a packet network installed in the vehicle. In the present example the network comprises an Ethernet network, but other suitable protocols can also be used. The network comprises multiple Ethernet links 36, and one or more Ethernet switches 40. In various embodiments, the bit rate used in the network may be 10G bits per second (10 Gbps) in accordance with IEEE 802.3ch, 100 Mbps in accordance with IEEE 802.3bw, 10 Mbps in accordance with IEEE 802.3cg(10Base-T1s), or any other suitable bit rate. Links 36 may comprise, for example, twisted-pair copper links or any other type of link suitable for Ethernet communication.

In some embodiments, system 20 further comprises a functional safety validator 44, referred to herein as "validator" for brevity. Validator 44 is configured to validate the compliance to functional safety requirements of Ethernet switches 40 using methods that are described in detail below. In various embodiments, validator 44 may be a stand-alone or dedicated system component, or a device that is integrated into other system components such as an onboard computer or other computer processing device disposed in the vehicle.

An inset at the bottom-left of FIG. 1 illustrates the internal configuration of an example Ethernet switch 40, in an embodiment. Other switches 40 in system 20 typically have similar configurations. In the present example, switch 40 comprises multiple ports 48, packet processing circuitry 52, a validation data collector 56, a validation data interface 58 and a memory 60. Ports 48 are configured to be connected to links 36 for communicating packets over the automotive network. Packet processing circuitry 52 is configured to receive packets from the automotive network via ports 48, including PTP packets, to process the received packets, and to forward the processed packets to the automotive network via ports 48. Validation data collector 56 (also referred to below as "collector" for brevity) is configured to derive validation records 64 from at least some of the PTP packets that are processed by packet-processing circuitry 52, and to store validation records 64 in memory 60.

Collector 56 is configured to make validation records 64 accessible to validator 44 via validation data interface 58. In the present context, the term "making the validation records accessible" refers to various schemes including "pull" schemes and "push" schemes. In a typical "pull" scheme, memory 60 (or at least the region of memory 60 that stores validation records 64) is accessible for readout by validator 44. In such a scheme, validator 44 may access validation records 64 as needed and obtain any desired validation data therefrom. In a typical "push" scheme, validation data collector 56 proactively transmits validation records 64 from switch 40 to validator 44. In either implementation, switches 40 and validator 44 may communicate over links 36 of the automotive network, or over separate links.

An inset at the bottom-right of FIG. 1 illustrates the internal configuration of validator 44, in an embodiment. As seen, in this embodiment validator 44 comprises an interface 68 and a validation processor 72. Interface 68 is configured for communicating with switches 40, e.g., for obtaining validation records 64. Validation processor 72 is configured to validate the data in validation records 64, obtained from switches 40, against functional safety requirements. Several non-limiting examples of validation tests are given below.

The configuration of automotive data-processing system 20 depicted in FIG. 1, and the configurations of its components such as switches 40 and validator 44, are example configurations that are depicted solely for the sake of clarity. In alternative embodiments, any other suitable configurations can be used.

For example, although the embodiments described herein refer mainly to network switches, the disclosed techniques can be used for validating the functional safety of other types of network elements that may be used in the automotive network, such as routers and network interface controllers (NICs). Generally, a network element may comprise multiple ports (e.g., in the case of a switch or router) or a single port (e.g., in the case of some NICs).

As another example, although the embodiments described herein refer mainly to PTP, the disclosed techniques may be carried out using any other suitable time-protocol, e.g., the Network Time Protocol (NTP). Additionally or alternatively, the validation data may comprise any other suitable data of a network element, dynamic or static, if the data are relevant for the required functionality. Non-limiting examples of data that may be used as validation data comprise voltage values, measured delays or cable lengths, data from various network protocols, and the like. As yet another example, although the embodiments described herein refer to validator 44 as being separate from switches 40, in some embodiments validator 40 may be implemented within one or more of switches 40.

The various elements of system 20 and its components, e.g., switches 40 and validator 44, may be implemented using dedicated hardware or firmware, such as using hardwired or programmable logic, e.g., in one or more Application-Specific Integrated Circuits (ASIC) and/or one or more Field-Programmable Gate Arrays (FPGA). Additionally or alternatively, some functions of the components of system 20, e.g., of switches 40 and/or validator 44, may be implemented in software and/or using a combination of hardware and software elements. Elements that are not mandatory for understanding of the disclosed techniques have been omitted from the figure for the sake of clarity.

In some embodiments, validation data collectors 56 (in switches 40) and/or validation processor 72 (in validator 44) comprise one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
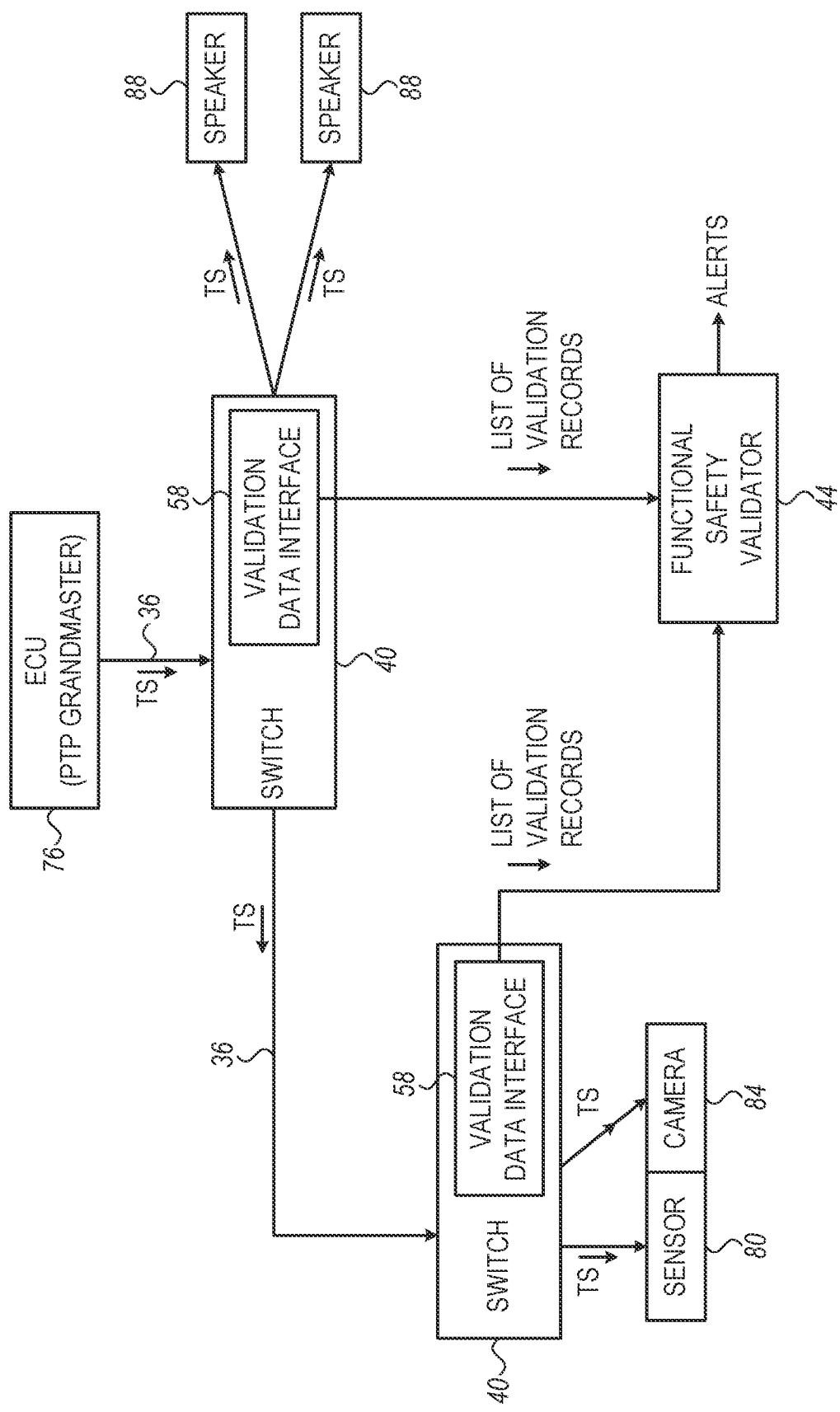
FIG. 2 is a diagram that schematically illustrates a process of validating the functional safety of network switches in the system of FIG. 1, in accordance with an embodiment that is described herein.

FIG. 2 is a diagram that schematically illustrates a process of validating the functional safety of network switches in system 20 of FIG. 1, in accordance with an embodiment that is described herein. This figure illustrates, inter alia, the use of PTP packets for functional safety validation.

In the example of FIG. 2, a certain ECU 76 in system 20 serves as a PTP grandmaster. ECU 76 sends PTP packets that carry timestamps (TS) to the automotive network, and the various network elements propagate the PTP packets across the network topology to the various endpoints (e.g., sensors, other ECUs, etc.). In the example topology depicted in FIG. 2, PTP packets are propagated via switches 40 to a sensor 80, a camera 84 and two audio speakers 88. In a given network element, a port over which a PTP packet is received is referred to as a "PTP slave port", and a port over which a PTP packet is transmitted is referred to as a "PTP master port".

Upon receiving a PTP packet from a link partner, each network element (in the present example switch 40) estimates (i) the time delay over the link connecting to the link partner and (ii) the time delay incurred by the network element itself. The network element adds these two time delays to the value of the timestamp in the PTP packet, and forwards the PTP packet to all output ports. In this manner, the various network elements and endpoints are synchronized to a common time-base. Further details regarding time-synchronization using PTP can be found in the IEEE 802.1AS-2020 standard, cited above.

In some embodiments, in parallel with the conventional use of the PTP packets for time synchronization, switches 40 and validator 44 use the PTP packets for functional safety validation. In each switch 40, validation data interface 58 derives a list of validation records (e.g., validation records 64 depicted in FIG. 1) from at least some of the PTP packets traversing the switch, and makes the validation records accessible to validator 44.

Validator 44 verifies, based on validation records 64 obtained from switches 40 (using "pull" or "push" as appropriate), whether switches 40 comply with the applicable functional safety requirements. In response to detecting that a certain switch 40 fails to comply with the functional safety requirements, validator 44 may issue an alert or initiate any other suitable responsive action.

In various embodiments, validation records 64 may comprise various types of information that (i) can be derived from the PTP packets and (ii) is indicative of compliance (or lack of compliance) with functional safety requirements. Non-limiting examples of validation data that safety validation circuitry 56 may include in validation records 64 comprise, for a given switch:

Values of timestamps that were received by the switch in incoming PTP packets.

Values of timestamps that were sent by the switch in outgoing PTP packets.

Port information relating to communicating PTP packets. Port information may comprise, for example, for a given PTP packet (received or sent), the port number via which the packet was received or sent, a local MAC address, a remote MAC address, and/or a PTP role of the port (e.g., whether serving as a master or slave).

Error events relating to the PTP packet, e.g., buffer overrun or loss of synchronization with the PTP grandmaster.

In various embodiments, validator 44 may assess the functional safety of switches 40 based on validation records 64 in various ways. For example, validator 44 may estimate the accuracy of sent and/or received timestamps. A timestamp accuracy that falls below some expected accuracy level may be indicative of a functional safety problem.

As another example, validator 44 may examine the temporal pattern of the PTP packets being received and/or sent by a switch 44. A deviation from an expected pattern may be indicative of a functional safety violation. For example, consider an implementation in which the PTP grandmaster generates PTP packets periodically at known time intervals, i.e., at a known frequency. For a fully functional system, corresponding PTP packets should be received at every slave port, and transmitted on every master port, at substantially the same frequency. A deviation from this frequency may be indicative of a functional failure. The port or ports in which the deviation is detected can provide information regarding the type and location of the failure.

As yet another example, validator 44 may use validation records 64 to monitor the network topology and detect changes from the expected topology. In a typical automotive network the topology is fixed and known in advance, and deviations from the known topology are highly indicative of a failure. For example, validator 44 may detect, based on the validation records, that a certain switch stops receiving PTP packets from a second switch. This change in topology is indicative of a failure. By examining the validation records of both switches, validator 44 may be able to detect whether the failure is in the transmitting switch, in the receiving switch, or in the link connecting the two switches.

In some embodiments, validator 44 may apply suitable Artificial Intelligence (AI) or Machine Learning (ML) techniques for analyzing the validation data, e.g., for identifying deviations from some expected pattern or topology. Application of AI techniques in the context of a vehicle network is addressed, for example, in U.S. patent application Ser. No. 17/396,710, which is assigned to the assignee of the present patent application and whose disclosure is incorporated herein by reference.

The functional safety tests described above are given solely by way of example, in order to demonstrate the disclosed techniques. In alternative embodiments, validator 44 may perform any other suitable test. As noted above, in some embodiments, the interfaces between validator 44 and switches 40, and the structure of the validation records, provide validator 44 with considerable flexibility in defining safety validation tests.

Figure 3:
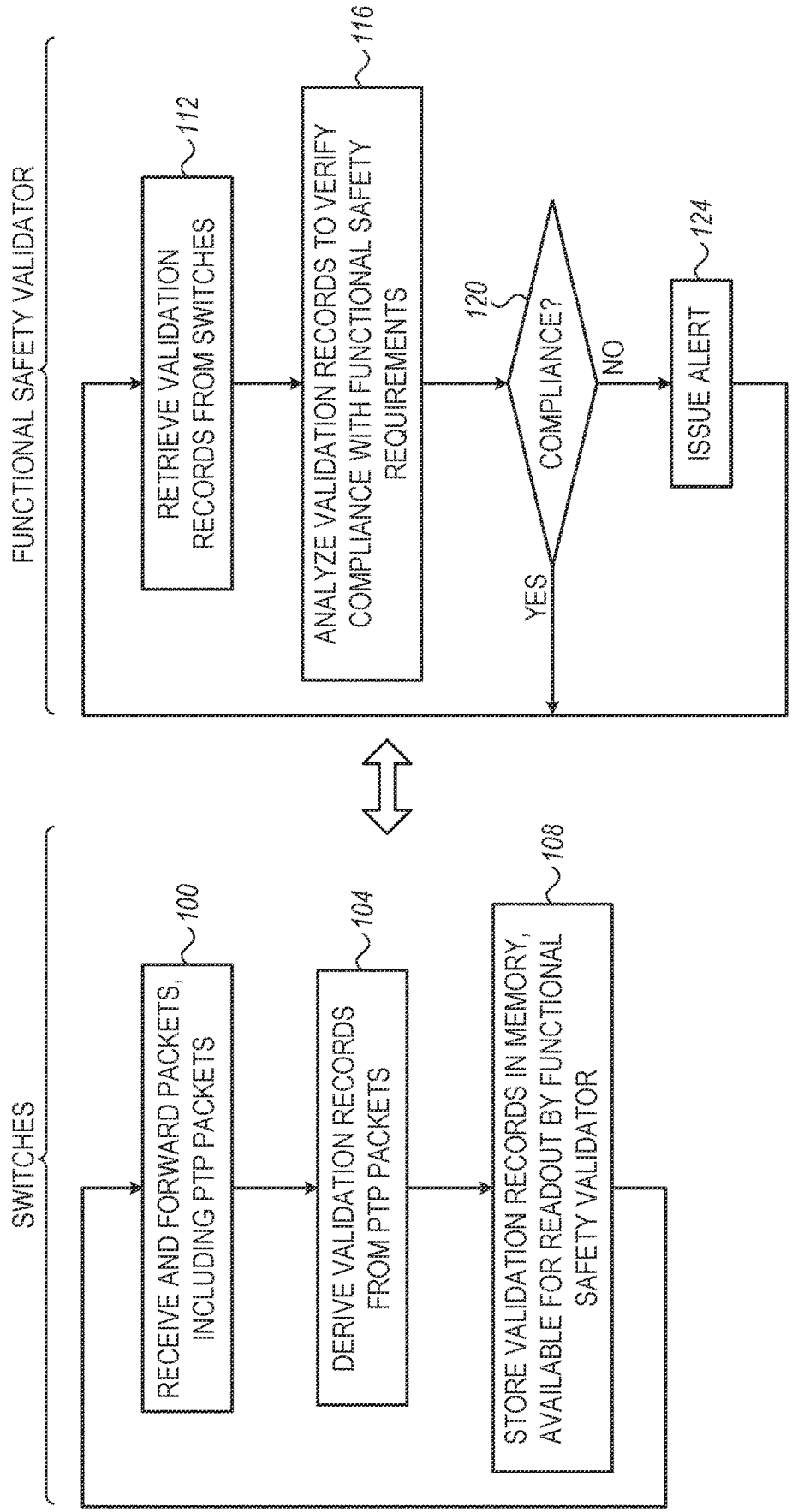
FIG. 3 is a flow chart that schematically illustrates a method for functional safety validation, in accordance with an embodiment that is described herein.

FIG. 3 is a flow chart that schematically illustrates a method for functional safety validation in system 20 of FIG. 1, in accordance with an embodiment that is described herein. The method comprises two sub-processes that are typically performed in parallel. A first sub-process, shown on the left-hand side of FIG. 3, is carried out by each switch 40. A second sub-process, seen on the right-hand side of the figure, is carried out by validator 44.

The first sub-process begins at a packet processing operation 100, with packet processing circuitry 52 of switch 40 receiving packets via ports 48, processing the packets and forwarding them via ports 48 back to the network. Some of the packets comprise PTP packets. At a validation data generation operation 104, safety validation circuitry 56 in switch 40 derives validation records 36 from at least some of the PTP packets processed by circuitry 52.

At a record storage operation 108, safety validation circuitry 56 stores validation records 64 in memory 60, making the validation records accessible for readout by validator 44. This example implementation is a "pull" scheme, in which validator 44 retrieves validation data from switch 40 as needed. In alternative embodiments, safety validation circuitry 56 may output the validation records in a "push" scheme, i.e., proactively transmit the validation records to validator 44.

The second sub-process begins at a validation data retrieval operation 112, with validator 44 retrieving validation records 64 from memories 60 of switches 40. At a validation analysis operation 116, validation processor 72 of validator 44 analyzes the validation records in order to verify whether switches 40 comply with the functional safety requirements. Upon detecting, at a checking operation 120, that a switch 40 is found to violate the functional safety requirements, validation processor 72 issues an alert, at an alerting operation 124.

The two sub-processes of FIG. 3 typically continue on an on-going basis throughout operation of switches 40 in the vehicle. Thus, deviation from the specified functional safety requirements can be detected and handled on-the-fly, if and as they occur.

Although the embodiments described herein mainly address functional safety validation in automotive communication networks, the methods and systems described herein can also be used in other applications, such as in aerospace and maritime devices, as well as in autonomous vehicles.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element for use in an automotive network, the automotive network being disposed within a vehicle, the network element comprising:
   one or more ports for communicating with other network elements of the vehicle over the automotive network in the vehicle;
   packet processing circuitry, configured to:
      receive packets from electronic subsystems of the vehicle via the one or more ports, the packets including time-protocol packets carrying time-stamps in accordance with a time protocol used for synchronizing the electronic subsystems to a common time-base, process the received packets, including adding (i) time delays incurred over links over which the time-protocol packets were received and (ii) time delays incurred by the network element to values of the timestamps in the received packets, and forwarding the processed packets to the electronic subsystems of the vehicle via the one or more ports; and a validation data collector, configured to derive, from at least some of the time-stamp of at least some of the time-protocol packets processed by the packet-processing circuitry and used for synchronizing the electronic subsystems, validation data indicative of compliance of the network element with a vehicle-safety requirement, and to make the validation data accessible from outside the network element.

2. The network element according to claim 1, wherein the validation data collector is configured to derive and export validation records comprising one or more of:

one or more of the time-stamps extracted from the at least some of the time-protocol packets processed by the packet processing circuitry;

one or more parameters of the one or more ports used for communicating the at least some of the time-protocol packets processed by the packet processing circuitry; and error events relating to the at least some of the time protocol packets processed by the packet processing circuitry.

3. The network element according to claim 1, wherein the time-protocol packets comprise Precision Time Protocol (PTP) packets.

4. The network element according to claim 1, wherein the validation data collector is configured to store the validation data in a memory, and to provide at least part of the validation data in response to a request from outside the network element.

5. The network element according to claim 1, wherein the validation data collector is configured to transmit at least part of the validation data from the network element, irrespective of any request from outside the network element.

6. A safety validation apparatus for use in a vehicle, the apparatus comprising:

an interface for communicating at least with a network element of an automotive network, the automotive network disposed within the vehicle; and a validation processor, configured to obtain from the network element validation data derived from time-stamps carried in time-protocol packets processed by the network element, wherein the time-protocol packets carry the time-stamps in accordance with a time protocol used for synchronizing electronic subsystems of the vehicle to a common time-base, the timestamps carried by at least some of the time-protocol packets having been set by the network device by adding (i) time delays incurred over links over which the time-protocol packets were received and (ii) time delays incurred by the network element, to values of the timestamps in the at least some of the time protocol packets entering the network element, and wherein the validation processor is and to verify, based on the validation data, that the network element complies with a vehicle-safety requirement.

7. The safety validation apparatus according to claim 6, wherein the validation processor is configured to verify that the network element complies with the vehicle-safety requirement by verifying an accuracy of one or more of the time-stamps in the time-protocol packets.

8. The safety validation apparatus according to claim 6, wherein the validation processor is configured to verify that the network element complies with the vehicle-safety requirement by verifying that a temporal pattern of the time-protocol packets matches an expected pattern.

9. The safety validation apparatus according to claim 6, wherein the validation processor is configured to verify that the network element complies with the vehicle-safety requirement by verifying a topology of the automotive network.

10. A method for use in a network element of an automotive network, the automotive network disposed within a vehicle, the method comprising:

receiving in the network element packets, the packets including time-protocol packets carrying time-stamps in accordance with a time protocol used for synchronizing electronic subsystems of the vehicle to a common time-base, processing the received packets, including adding (i) time delays incurred over links over which the time-protocol packets were received and (ii) time delays incurred by the network element to values of the timestamps in the received packets, and forwarding the processed packets to the electronic subsystems of the vehicle;

deriving in the network element, from at least some of the time-stamps of at least some of the time-protocol packets processed by the network element and used for synchronizing the electronic subsystems, validation data indicative of compliance of the network element with a vehicle-safety requirement; and making the validation data accessible from outside the network element.

11. The method according to claim 10, wherein deriving and the validation data accessible comprises deriving exporting validation records comprising one or more of:

one or more of the time-stamps extracted from the at least some of the processed time-protocol packets;

one or more parameters of one or more ports of the network element used for communicating the at least some of the processed time-protocol packets; and error events relating to the at least some of the processed time-protocol packets.

12. The method according to claim 10, wherein the time-protocol packets comprise Precision Time Protocol (PTP) packets.

13. The method according to claim 10, wherein making the validation data accessible comprises storing the validation data in a memory, and providing at least part of the validation data in response to a request from outside the network element.

14. The method according to claim 10, wherein making the validation data accessible comprises transmitting at least part of the validation data from the network element, irrespective of any request from outside the network element.

15. A safety validation method for use in a vehicle, the method comprising:

obtaining, from a network element of an automotive network, the automotive network disposed within the vehicle, validation data derived from time-stamps carried in time-protocol packets processed by the network element, wherein the time-protocol packets carry the time-stamps in accordance with a time protocol used for synchronizing the electronic subsystems to a common time-base, wherein the timestamps carried by at least some of the time-protocol packets have been set by the network device by adding (i) time delays incurred over links over which the time-protocol packets were received and (ii) time delays incurred by the network element to values of the timestamps in the at least some of the time protocol packets entering the network element;

and verifying, based on the validation data, that the network element complies with a vehicle-safety requirement.

16. The safety validation method according to claim 15, wherein verifying that the network element complies with the vehicle-safety requirement comprises verifying an accuracy of one or more of the timestamps in the time-protocol packets.

17. The safety validation method according to claim 15, wherein verifying that the network element complies with the vehicle-safety requirement comprises verifying that a temporal pattern of the time-protocol packets matches an expected pattern.

18. The safety validation method according to claim 15, wherein verifying that the network element complies with the vehicle-safety requirement comprises verifying a topology of the automotive network.

* * * * *